(12) United States Patent
Kabutoya et al.

(10) Patent No.: US 10,472,545 B2
(45) Date of Patent: *Nov. 12, 2019

(54) SEALING SHEET (71) Applicant: Nitto Denko Corporation, Ibaraki-shi, Osaka (JP)

(72) Inventors: Ryuuichi Kabutoya, Ibaraki (JP); Shigeki Muta, Ibaraki (JP); Masatoshi Suzuki, Ibaraki (JP); Tetsuya Hirose, Ibaraki (JP); Shinji Inokuchi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,345

(22) Filed: Dec. 19, 2013

(65) Prior Publication Data

US 2014/0174654 A1 Jun. 26, 2014

Related U.S. Application Data

(60) Provisional application No. 61/745,860, filed on Dec. 26, 2012.

(51) Int. Cl.
*C09J 7/38* (2018.01)
*C09J 171/02* (2006.01)
(Continued)

(52) U.S. Cl.
CPC .............. *C09J 7/38* (2018.01); *C08G 65/336* (2013.01); *C09J 7/22* (2018.01); *C09J 171/02* (2013.01); *F16J 15/064* (2013.01); *B32B 37/12* (2013.01); *B32B 38/10* (2013.01); *B32B 2310/0831* (2013.01); *C08G 77/12* (2013.01); *C08K 5/0066* (2013.01); *C08K 5/49* (2013.01); *C08K 5/54* (2013.01); *C09J 2201/128* (2013.01); *C09J 2205/102* (2013.01); *C09J 2427/006* (2013.01); *C09J 2471/00* (2013.01);
(Continued)

(58) Field of Classification Search
CPC ............ C09J 2201/128; C09J 2205/102; C09J 2427/006
See application file for complete search history.

(56) References Cited

U.S. PATENT DOCUMENTS 5,086,088 A 2/1992 Kitano et al.
2004/0070156 A1 4/2004 Smith et al.
(Continued)

FOREIGN PATENT DOCUMENTS

CN 102449060 5/2012
EP 2 341 113 7/2011
(Continued)

OTHER PUBLICATIONS

Derwent Abstract of EP 2365178. See above for date and inventor.*
(Continued)

*Primary Examiner* — Victor S Chang
(74) *Attorney, Agent, or Firm* — Wenderoth, Lind & Ponack, L.L.P.

(57) ABSTRACT

The present invention provides a sealing sheet containing a flame retardant adhesive sheet having a flame retardant-containing adhesive layer, wherein the flame retardant-containing adhesive layer has a void content of 5-40%.

10 Claims, 4 Drawing Sheets

(51) Int. Cl.
- *F16J 15/06* (2006.01)
- *C08G 65/336* (2006.01)
- *C09J 7/22* (2018.01)
- *B32B 37/12* (2006.01)
- *C08K 5/00* (2006.01)
- *C08K 5/49* (2006.01)
- *C08K 5/54* (2006.01)
- *C08G 77/12* (2006.01)
- *B32B 38/10* (2006.01)

(52) U.S. Cl.
CPC .... *Y10T 156/10* (2015.01); *Y10T 428/249983* (2015.04); *Y10T 428/249984* (2015.04)

(56) References Cited

U.S. PATENT DOCUMENTS

| | | | |
|---|---|---|---|
| 2007/0123598 A1* | 5/2007 | Nam | B29C 44/3419 521/79 |
| 2011/0156353 A1 | 6/2011 | Kabutoya et al. | |
| 2012/0073631 A1 | 3/2012 | Ikenaga et al. | |
| 2014/0004342 A1 | 1/2014 | Tojo et al. | |

FOREIGN PATENT DOCUMENTS

| | | |
|---|---|---|
| EP | 2365178 A2 * | 9/2011 |
| JP | 2-272076 | 11/1990 |
| JP | 2-142451 | 12/1990 |
| JP | 2005-200958 | 7/2005 |
| JP | 2006-22189 | 1/2006 |
| JP | 2011-153706 | 8/2011 |
| JP | 2012-180495 | 9/2012 |

OTHER PUBLICATIONS

Translation of EP 2365178. See PTO-892 mailed Feb. 19, 2016 for date and inventor.*
Office Action dated Jun. 13, 2016 in corresponding Singapore Patent Application No. 2013095500.
Notification of First Office Action dated Feb. 6, 2017 in corresponding Chinese Application No. 201310737438.8, with English translation.
Notice of Reasons for Refusal dated Jul. 18, 2017 in corresponding Japanese Application No. 2013-269527, with English Translation.
Office Action dated Oct. 31, 2017 in Chinese Application No. 201310737438.3, with English Translation.
Extended European Search Report dated Mar. 3, 2014 in European Application No. 13 19 9273.
Database WPI, Week 200576 Thomson Scientific, XP-002720565, AN 2005-73 8224, JP 2005 290243, Oct. 20, 2005.

* cited by examiner

SEALING SHEET

TECHNICAL FIELD OF THE INVENTION

The present invention relates to a flame retardant sealing sheet simultaneously showing high flame retardance and high seal performance.

BACKGROUND OF THE INVENTION

For example, since electrical components, electric wiring and the like are set under the floor panel of aircrafts, it is necessary to shut off the moisture and humidity from the floor panel so that the moisture will not penetrate under the floor panel. However, since the floor panel is fixed onto the body frame by bolting, it is difficult to completely prevent moisture permeation from the clearance between a bolt and a screw hole formed for bolting a floor panel, even when the bolt is screwed into the screw hole. For this reason, a sealing sheet is adhered to a floor panel to shut off the floor panel from water and humidity.

In addition, an antenna to aid communication between aircrafts and distant places is set on the outer surface of the body wall (outer board) of the aircrafts. Many of such antennas have a plate-like fixing board having an electric connector protruding from one surface thereof. The surface of the fixing board having the protruding electric connector is superposed on the outer face of the outer board, the connector is inserted into the inside of an aircraft from the hole formed on the outer board of the aircraft, and connected to an appropriate electric circuit in the aircraft. In this case, the fixing board of the antenna is fixed removably with a bold on the outer board of the aircraft, where the outer board and the antenna fixing board are fixed via a gasket to block water and humidity from the outside from the fixed part. For example, US2004/0070156A1 proposes a material consisting of an adhesive sheet wherein an adhesive layer of a flexible polyurethane gel is formed on both the front and the back of a substrate film as this kind of gasket. This publication describes to maintain superior sealing property, since polyurethane gel is superior in the flexibility, elasticity, compressibility, flexibility and the like, and nonreactive with the constituent materials (specifically aluminum etc.) of the outer board of aircrafts and antenna fixing board, and water (including brine).

Aircraft members are required to have high flame retardancy. Therefore, a flame retardant is added to the aforementioned sealing sheet and gasket. Since halogen flame retardants show a high flame retardant effect, a member containing a halogen flame retardant shows high flame retardance, but the halogen flame retardant generates a large amount of toxic halogen gas by combustion. Therefore, the present inventors previously proposed a gasket composed of an adhesive sheet, which shows high flame retardance though it contains a halogen-free flame retardant (US2011/0156353 A1).

SUMMARY OF THE INVENTION

In the subsequent studies, they have found that this sealing sheet when adhered to an SUS plate or an aluminum plate maintains superior seal performance preventing corrosion of the SUS plate and the aluminum plate for a long term; however, when adhered to a duralumin plate, it cannot maintain superior seal performance of the same level as when adhered to an SUS plate or an aluminum plate.

In view of the above-mentioned situation, the present invention aims to provide a sealing sheet simultaneously showing high flame retardance and high seal performance. In addition, the present invention aims to provide a sealing sheet simultaneously showing high flame retardance and high seal performance, and free of generation of a toxic halogen gas during combustion.

The present inventors have conducted intensive studies in an attempt to solve the aforementioned problems and found that a sealing sheet mainly composed of a flame retardant adhesive sheet having a flame retardant-containing adhesive layer can maintain good seal performance to keep a metal plate from corrosion while showing high flame retardance, even when adhered to an easily corrodible metal plate such as a duralumin plate, by controlling the content of voids in the flame retardant-containing adhesive layer to fall within a particular range. Further studies based on such finding have resulted in the completion of the present invention.

Accordingly, the present invention provides the following.

[1] A sealing sheet comprising a flame retardant adhesive sheet having a flame retardant-containing adhesive layer, wherein the flame retardant-containing adhesive layer has a void content of 5-40%.

[2] The sealing sheet of the above-mentioned [1], wherein the flame retardant-containing adhesive layer is a flame retardant-containing polyoxyalkylene adhesive layer.

[3] The sealing sheet of the above-mentioned [2], wherein the flame retardant-containing polyoxyalkylene adhesive layer is a cured product layer of a composition containing the following components A-D:
A: a polyoxyalkylene polymer having at least one alkenyl group in one molecule
B: a compound containing two or more hydrosilyl groups on average in one molecule
C: a hydrosilylation catalyst
D: a flame retardant.

[4] The sealing sheet of any one of the above-mentioned [1]-[3], wherein the flame retardant-containing adhesive layer contains a tackifier resin.

[5] The sealing sheet of any one of the above-mentioned [1]-[4], wherein the flame retardant adhesive sheet is an adhesive sheet composed of a laminate of flame retardant-containing adhesive layer/core film/flame retardant-containing adhesive layer.

[6] The sealing sheet of the above-mentioned [5], wherein the core film is composed of a plastic film.

[7] The sealing sheet of any one of the above-mentioned [1]-[4], wherein the flame retardant adhesive sheet is an adhesive sheet composed of a single flame retardant-containing adhesive layer.

[8] The sealing sheet of any one of the above-mentioned [1]-[7], wherein the flame retardant adhesive sheet has a substrate sheet laminated on one surface thereof.

[9] The sealing sheet of the above-mentioned [8], wherein the substrate sheet is a fluororesin sheet.

[10] The sealing sheet of any one of the above-mentioned [1]-[9], wherein the flame retardant is a halogen-free flame retardant.

[11] The sealing sheet of the above-mentioned [10], wherein the halogen-free flame retardant is a phosphorus flame retardant.

[12] A method of protecting corrosion of a metal material, comprising isolating the metal material from humidity and water (salt water) with a sealing sheet comprising a flame retardant adhesive sheet having a flame retardant-containing adhesive layer having a void content of 5-40%.

[13] The method of the above-mentioned [12], wherein the metal material is a duralumin plate.

[14] The method of the above-mentioned [12] or [13], wherein the flame retardant-containing adhesive layer is a flame retardant-containing polyoxyalkylene adhesive layer.

[15] The method of the above-mentioned [14], wherein the flame retardant-containing polyoxyalkylene adhesive layer is a cured product layer of a composition containing the following components A-D:

A: a polyoxyalkylene polymer having at least one alkenyl group in one molecule

B: a compound containing two or more hydrosilyl groups on average in one molecule C: a hydrosilylation catalyst D: a flame retardant.

[16] The method of any one of the above-mentioned [12]-[15], wherein the sealing sheet has a substrate sheet laminated on one surface of a flame retardant adhesive sheet.

[17] The method of the above-mentioned [16], wherein the substrate sheet is a fluororesin sheet.

[18] The method of any one of the above-mentioned [12]-[17], wherein the flame retardant adhesive sheet is an adhesive sheet composed of a single flame retardant-containing adhesive layer.

[19] The method of any one of the above-mentioned [12]-[17], wherein the flame retardant adhesive sheet is an adhesive sheet composed of a laminate of flame retardant-containing adhesive layer/core film/flame retardant-containing adhesive layer.

[20] The method of any one of the above-mentioned [12]-[19], wherein the flame retardant-containing adhesive layer contains a tackifier resin.

According to the present invention, a sealing sheet simultaneously showing high flame retardance and high seal performance can be afforded. Therefore, the sealing sheet of the present invention can be used for an airframe or inside of an airframe that require high flame retardance such as aircraft and the like. Moreover, a sealed object can be isolated from humidity and water (salt water) for a long term by adhering the sealing sheet of the present invention to a surface of the sealed object (object to be sealed). Therefore, corrosion and discoloration of such sealed object can be prevented at a high level even when it is made from a metal comparatively easily corroded such as duralumin.

BRIEF DESCRIPTION OF THE DRAWINGS

FIG. 6(A)-FIG. 6(C) are schematic views showing the production step of the sealing sheet shown in FIG. 1.

In the Figures, 1 is a flame retardant-containing adhesive layer, 2 is a core film, 3 is a flame retardant adhesive sheet, 4 is a substrate sheet, 10, 11 are sealing sheets, and 20, 21 are sealed objects.

DETAILED DESCRIPTION OF THE INVENTION

The present invention is explained in the following by referring to preferable embodiments.

Figure 1:
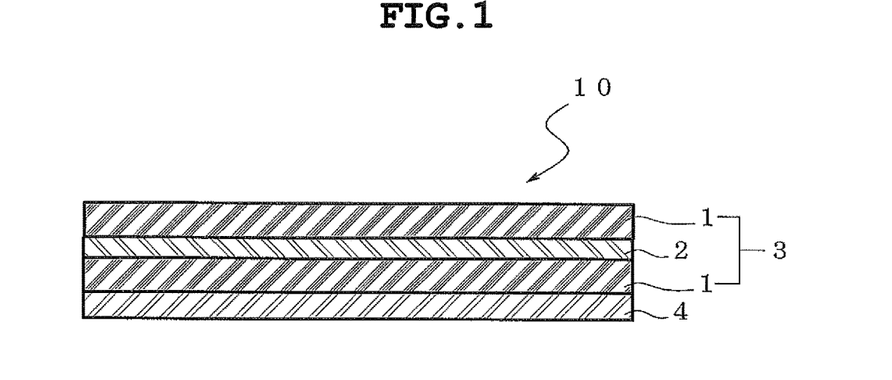
FIG. 1 is a schematic sectional view of the sealing sheet of the first embodiment of the present invention.
Figure 2:
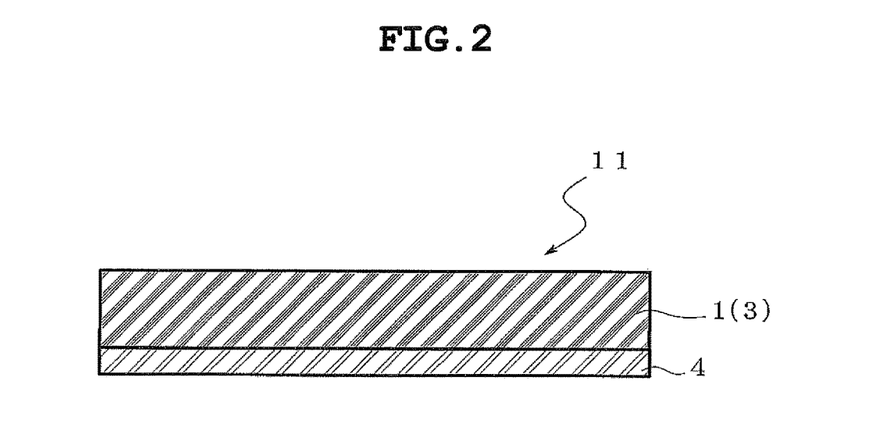
FIG. 2 is a schematic sectional view of the sealing sheet of the second embodiment of the present invention.

FIG. 1 is a schematic sectional view of the sealing sheet of the first embodiment of the present invention, and FIG. 2 is a schematic sectional view of the sealing sheet of the second embodiment of the present invention.

The sealing sheet of the present invention contains, as shown in the sealing sheets 10, 11 in the first and the second embodiments, a flame retardant adhesive sheet 3 having a flame retardant-containing adhesive layer 1, and mainly characterized by a void content of 5-40% of the flame retardant-containing adhesive layer 1 of the flame retardant adhesive sheet 3.

In the sealing sheet 10 of the first embodiment of FIG. 1, the flame retardant adhesive sheet 3 is a laminate of the flame retardant-containing adhesive layer 1/core film 2/flame retardant-containing adhesive layer 1 in this order. In the sealing sheet 11 of the second embodiment of FIG. 2, the flame retardant adhesive sheet 3 is composed of a single flame retardant-containing adhesive layer 1. In FIG. 1 and FIG. 2, the symbol 4 is a substrate sheet laminated on one surface of the flame retardant adhesive sheet 3.

In the present invention, the "void content of the flame retardant-containing adhesive layer of the flame retardant adhesive sheet" is the ratio (% by volume) of voids in the whole flame retardant-containing adhesive layer. When the flame retardant adhesive sheet 3 is formed by the single flame retardant-containing adhesive layer 1 shown in FIG. 2, it is the ratio (% by volume) of voids relative to the flame retardant-containing adhesive layer as 1. When the flame retardant adhesive sheet 3 is formed from the laminate of flame retardant-containing adhesive layer 1/core film 2/flame retardant-containing adhesive layer 1 shown in FIG. 1, it is the ratio of voids (% by volume, the total amount) contained in two flame retardant-containing adhesive layer 1 relative to the two flame retardant-containing adhesive layer 1 as a whole.

Figure 3:
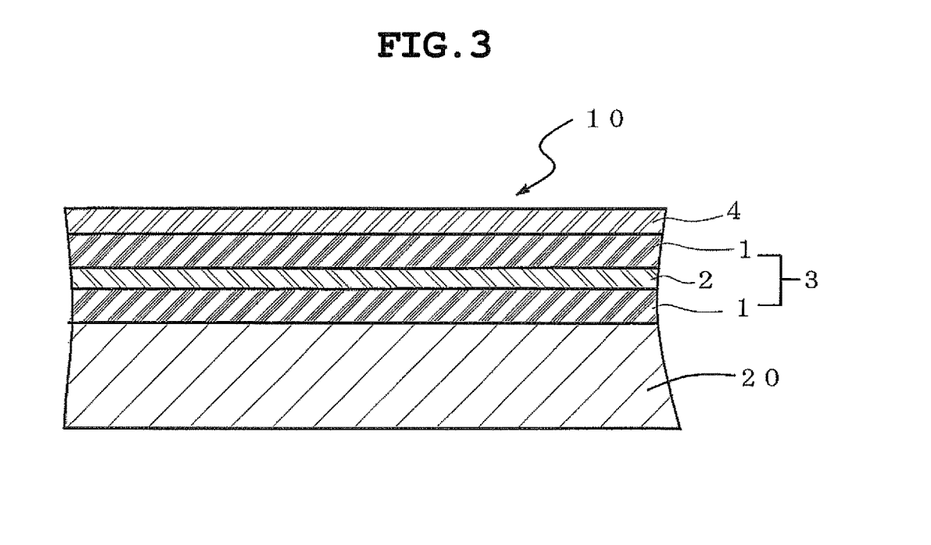
FIG. 3 is a schematic sectional view showing the sealing sheet of FIG. 1 during use (the first use form) together with a sealed object.
Figure 4:
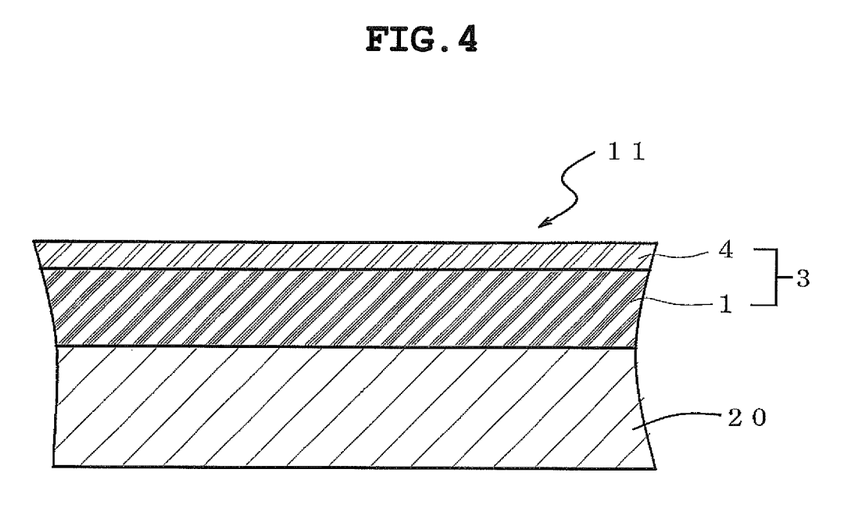
FIG. 4 is a schematic sectional view showing the sealing sheet of FIG. 2 during use (the first use form) together with a sealed object.

FIGS. 3, 4 are each a schematic sectional view showing the embodiments of the sealing sheets of FIGS. 1, 2 during use. As shown in FIG. 3, the sealing sheets 10, 11 of the present invention are used by adhering the adhesive face of the flame retardant-containing adhesive layer 1 of the flame retardant adhesive sheet 3 to a sealed object 20.

In the sealing sheet 10 of FIG. 1, since the flame retardant adhesive sheet 3 (laminate in the order of flame retardant-containing adhesive layer 1/core film 2/flame retardant-containing adhesive layer 1) contains a core film 2 therein, the sheet shows superior moisture permeability resistance even without increasing the thickness of the flame retardant adhesive sheet 3 as a whole. Thus, since the flame retardant adhesive sheet 3 has a core film 2, the sealing sheet 10 shows more improved sealability (sealability to isolate sealed object 20 from humidity and water (salt water)).

In addition, in FIG. 1 and FIG. 2, a substrate sheet 4 laminated on one surface of the flame retardant adhesive sheet 3 contributes to the improvement of the rigidity (self-supporting property), moisture permeability resistance, water permeability resistance, salt water resistance and the like of the sealing sheets 10, 11. However, a substrate sheet 4 is not always necessary, and the presence of the substrate sheet 4 can be appropriately determined according to the place to be applied to, necessity of water stop performance and the like of the sealing sheet.

Figure 5:
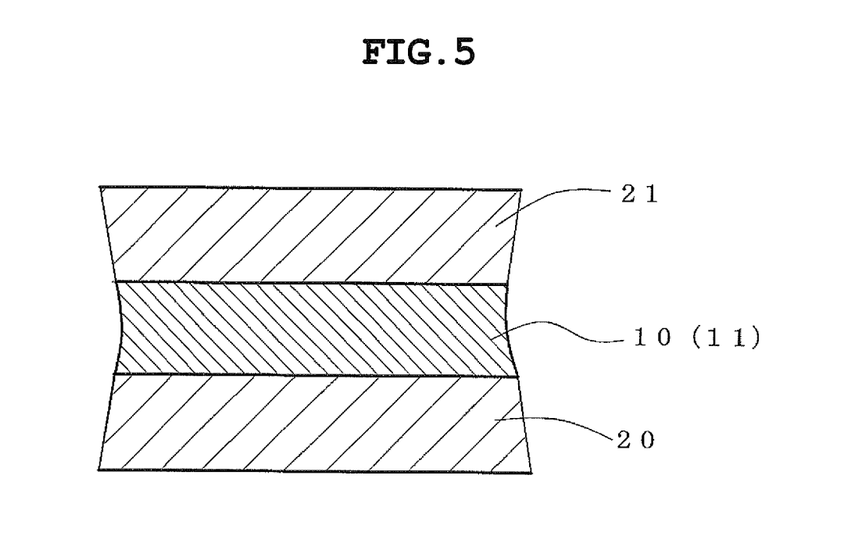
FIG. 5 is a schematic sectional view showing other use form (the second use form) together with a sealed object.

As shown in FIGS. 3, 4, the sealing sheet is used by adhering the adhesive face of the flame retardant-containing adhesive layer 1 of the flame retardant adhesive sheet 3 of the sealing sheets 10, 11 to the sealed object 20. When the part between the opposing two sealed objects is to be isolated from humidity and water (salt water), as shown in FIG. 5, sealing sheets 10, 11 are interposed between the two sealed objects 20, 21. In this case, an embodiment wherein two sealed objects 20, 21 are pressed from the up and down directions to sandwich the sealing sheets 10, 11 between the opposing faces of the sealed objects 20, 21 may be employed. In this embodiment, when the sealing sheets 10, 11 have a substrate sheet 4 (see FIGS. 1, 2), the sealing sheets 10, 11 can maintain a uniform shape, which enables sealing sheets 10, 11 to be uniformly adhered to the sealed objects 20, 21 for a long term, and superior seal performance to be maintained for a longer term.

[Flame Retardant Adhesive Sheet]

In the sealing sheet of the present invention, the flame retardant-containing adhesive layer 1 of the flame retardant adhesive sheet 3 is adjusted to have a void content within the range of 5-40%. When the flame retardant-containing adhesive layer 1 has such a void content, the sealing sheet has sufficiently high flame retardance and sufficiently high seal performance to keep the sealed object certainly isolated from humidity and water (salt water) for a long term. The void content is preferably not less than 7%, more preferably not less than 10%, further not less than 15%, especially preferably not less than 17%. The void content is preferably not more than 38%, more preferably not more than 35%, further preferably not more than 30%.

In the present invention, the "void content of the flame retardant-containing adhesive layer of the flame retardant adhesive sheet" is calculated by the following formula (1).

$$\text{void content}(\%) = (1 - \text{actual specific gravity}/\text{theoretical specific gravity}) \times 100 \quad (1)$$

The "actual specific gravity" in the formula (1) is a specific gravity of the flame retardant adhesive sheet as measured by a gravimeter, and the "theoretical specific gravity" is a specific gravity (measured by gravimeter) of the flame retardant adhesive sheet after 3t press at 80° C. atmosphere (humidity: 50% RH) for 15 min. The flame retardant adhesive sheet here is a measurement sample having a flat plane size of 50 mm×50 mm.

The flame retardant-containing adhesive layer 1 of the flame retardant adhesive sheet 3 is produced by, as shown below, a step of applying a flame retardant-containing adhesive composition containing at least a pressure-sensitive adhesive (adhesive substrate) and a flame retardant to one surface of the core film or substrate sheet to form a coated film having a given thickness. Generally, in a mixing operation (stirring operation) for the preparation of a flame retardant-containing adhesive composition, air is involved in the composition and becomes voids in the flame retardant-containing adhesive layer 1. Therefore, the void content of the flame retardant-containing adhesive layer 1 can be controlled by adjusting, for example, the rate of stirring rotation, stirring time and the like. In addition, the void content of the flame retardant-containing adhesive layer 1 can be adjusted by a defoaming treatment after the mixing operation, or controlling the conditions (e.g., static time in static defoaming and the like) of the defoaming treatment.

<Flame Retardant-Containing Adhesive Layer>

The flame retardant-containing adhesive layer 1 can be formed from an adhesive composition obtained by blending a pressure sensitive adhesive and a flame retardant. While the pressure sensitive adhesive is not particularly limited, those capable of forming a pressure-sensitive adhesive layer superior in the elasticity, compressibility and adhesion are preferable. For example, acrylic, silicone or polyoxyalkylene adhesives can be mentioned. Among these, polyoxyalkylene adhesive is superior in the elasticity, compressibility and adhesion, and can form a pressure-sensitive adhesive layer superior in the removability. Use of the polyoxyalkylene adhesive is preferable, since a sealing sheet can be easily separated from a sealed object during maintenance.

(Acrylic Adhesive)

Specifically, as the acrylic adhesive, an acrylic adhesive containing, as a base polymer, an acrylic polymer with a monomer unit of alkyl(meth)acrylate as a main backbone is preferable (here, the "(meth)acrylate" means "acrylate and/or methacrylate").

The average carbon number of the alkyl group of the alkyl(meth)acrylate constituting the main backbone of the acrylic polymer is preferably about 1 to 18. Specific examples of such alkyl(meth)acrylate include methyl(meth)acrylate, ethyl(meth)acrylate, n-butyl(meth)acrylate, 2-ethylhexyl(meth)acrylate, isooctyl(meth)acrylate, isononyl(meth)acrylate, lauryl(meth)acrylate and the like. One or more kinds of these are used in combination. Among these, alkyl(meth)acrylate wherein the carbon number of the alkyl group is 1 to 12 is preferable.

One or more kinds of various monomers may be introduced into an acrylic polymer by copolymerization to improve adhesiveness to a sealed object and heat resistance of the pressure-sensitive adhesive sheet containing a non-halogenated flame retardant. Specific examples of such copolymerizable monomer include monomers containing a hydroxyl group such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl (meth)acrylate and the like; monomers containing a carboxyl group such as (meth)acrylic acid, carboxyethyl(meth)acrylate, carboxypentyl(meth)acrylate, itaconic acid, maleic acid, fumaric acid, crotonic acid and the like; monomers containing an acid anhydride group such as maleic anhydride, itaconic anhydride and the like; caprolactone adduct of acrylic acid; monomers containing a sulfo group such as styrenesulfonic acid, allylsulfonic acid, 2-(meth)acrylamide-2-methylpropanesulfonic acid, (meth)acrylamidepropanesulfonic acid, sulfopropyl(meth)acrylate, (meth)acryloyloxynaphthalenesulfonic acid and the like; monomers containing a phosphate group such as 2-(phosphonooxy)ethyl acrylate etc., and the like. In addition, nitrogen containing vinyl monomers can be mentioned, for example, maleimide, N-cyclohexylmaleimide, N-phenylmaleimide; N-acryloylmorpholine; (N-substitution)amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, N-methylolpropane(meth)acrylamide and the like; alkylaminoalkyl(meth)acrylate monomers such as aminoethyl(meth)acrylate, aminopropyl(meth)acrylate, N,N-dimethylaminoethyl(meth)acrylate, t-butylaminoethyl(meth)acrylate, 3-(3-pyridinyl)propyl(meth)acrylate and the like; alkoxyalkyl(meth)acrylate monomers such as methoxyethyl(meth)

acrylate, ethoxyethyl(meth)acrylate and the like; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, N-acryloylmorpholine etc., and the like can be mentioned.

Furthermore, vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam and the like; cyanoacrylate monomers such as acrylonitrile, methacrylonitrile and the like; epoxy group-containing acrylic monomers such as glycidyl(meth)acrylate and the like; glycol acrylate monomers such as polyethylene glycol(meth)acrylate, polypropylene glycol(meth)acrylate, methoxyethyleneglycol(meth)acrylate, methoxypolypropyleneglycol (meth)acrylate and the like; acrylate monomers such as tetrahydrofurfuryl(meth)acrylate, fluorine-containing (meth)acrylate, silicone(meth)acrylate, 2-methoxyethylacrylate etc., and the like can also be mentioned.

Among these, when an isocyanate based crosslinking agent is used as a crosslinking agent, a hydroxyl group-containing monomer is preferable since the reactivity with the isocyanate group is good. Carboxyl group-containing monomers such as (meth)acrylic acid and the like are preferable and acrylic acid is particularly preferable in view of the adhesiveness of the pressure-sensitive adhesive sheet containing a non-halogenated flame retardant to a sealed object, adhesion durability, weatherability and the like.

The weight ratio of the copolymerizable monomer in the acrylic polymer is preferably about 0.1-10 wt %.

While the average molecular weight of the acrylic polymer is not particularly limited, the weight average molecular weight is generally about 300,000 to 2,500,000.

Acrylic polymers are produced by various known methods and, for example, radical polymerization methods such as bulk polymerization method, solution polymerization method, suspension polymerization method and the like can be appropriately employed. As a radical polymerization initiator, various known azo based initiators and peroxide based initiators can be used. The reaction temperature is generally about 50 to 80° C., and the reaction time is 1 to 8 hr.

The acrylic adhesive can contain a crosslinking agent in addition to a base polymer, and the crosslinking agent can improve adhesion to a sealed object and durability, and can provide reliability at a high temperature and maintain the form of the adhesive itself. As the crosslinking agent, a known crosslinking agent such as isocyanate based crosslinking agents, epoxy based crosslinking agents, peroxide based crosslinking agents, metal chelate based crosslinking agents, oxazoline based crosslinking agents and the like can be appropriately used. One or more kinds of these crosslinking agents can be used in combination. The amount of the crosslinking agent to be used is not more than 10 parts by weight, preferably 0.01-5 parts by weight, more preferably 0.02-3 parts by weight, relative to 100 parts by weight of the acrylic polymer. A ratio of the crosslinking agent exceeding 10 parts by weight is not preferable, since crosslinking may proceed too much to decrease adhesiveness.

(Silicone Adhesive)

The silicone adhesive is not particularly limited, and peroxide crosslinked silicone adhesives (peroxide curable silicone adhesive) and addition reaction silicone adhesives, which are generally used, can be preferably used. These peroxide crosslinked silicone adhesives and addition reaction silicone adhesives may be commercially available products. Specific examples of the peroxide crosslinked silicone adhesive include KR-3006A/BT manufactured by Shin-Etsu Chemical Co., Ltd., SH 4280 PSA manufactured by Toray Dow Corning Corporation Silicone and the like. Specific examples of the addition reaction silicone adhesive include X-40-3501 manufactured by Shin-Etsu Chemical Co., Ltd., BY 24-712 manufactured by Toray Dow Corning Corporation Silicone, TSE32X manufactured by Momentive Performance Materials Inc and the like.

(Polyoxyalkylene Adhesive)

As the polyoxyalkylene adhesive, a cured product of a composition containing the following components A-C is preferable:

A: a polyoxyalkylene polymer having at least one alkenyl group in each molecule

B: a compound containing two or more hydrosilyl groups on average in each molecule C: a hydrosilylation catalyst.

The above-mentioned "polyoxyalkylene polymer having at least one alkenyl group in each molecule" for component A is not particularly limited, and various polymers can be used. However, one wherein the main chain of the polymer has a repeat unit represented by the formula (1) shown below is preferable:

formula (1):

wherein $R^1$ is an alkylene group.

$R^1$ is preferably a linear or branched alkylene group having 1 to 14, more preferably 2 to 4, carbon atoms.

As specific examples of the repeat unit represented by the general formula (1), —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O— and the like can be included. The main chain skeleton of the polyoxyalkylene polymer may consist of only one kind of repeat unit, and may consist of two kinds or more of repeat units. Particularly, from the aspects of availability and workability, a polymer having —CH$_2$CH(CH$_3$)O— as a main repeat unit is preferable. In the main chain of the polymer, a repeat unit other than the oxyalkylene group may be contained. In this case, the total sum of oxyalkylene units in the polymer is preferably not less than 80% by weight, particularly preferably not less than 90% by weight.

Although the polymer of component A may be a linear polymer or a branched polymer, or a mixture thereof, it preferably contains a linear polymer in a proportion of not less than 50% by weight, so that the adhesive layer will show good adhesiveness to the surface of various materials.

The molecular weight of the polymer of component A is preferably 500 to 50,000, more preferably 5,000 to 30,000, in terms of number-average molecular weight. When the number average molecular weight is less than 500, the obtained cured product tends to be too brittle, and when the number average molecular weight exceeds 50,000, the viscosity becomes unfavorably too high to markedly decrease workability. The number average molecular weight here means the value obtained by Gel Permeation Chromatography (GPC) method.

The polymer of component A preferably has a narrow molecular weight distribution wherein the ratio of weight-average molecular weight and number-average molecular weight (Mw/Mn) is not more than 1.6; a polymer having an Mw/Mn of not more than 1.6 produces a decreased viscosity of the composition and offers improved workability. Hence, the Mw/Mn is more preferably not more than 1.5, still more preferably not more than 1.4. As mentioned herein, Mw/Mn refers to a value obtained by the gel permeation chromatography (GPC) method.

Here, the molecular weight (based on polystyrene) is measured by the GPC method using GPC apparatus (HLC-8120GPC) manufactured by Tosoh Corporation, where the measurement conditions are as follows.

sample concentration: 0.2 wt % (THF solution)
sample injection volume: 10 µl
eluent: THF
so flow rate: 0.6 ml/min
measurement temperature: 40° C.
column: sample column TSKgel GMH-H(S)
detector: differential refractometer With regard to the polymer of component A (polyoxyalkylene polymer having at least one alkenyl group in each molecule), the alkenyl group is not subject to limitation, but an alkenyl group represented by the formula (2) shown below is suitable:

$$H_2C=C(R^2)-\qquad \text{formula (2):}$$

wherein $R^2$ is hydrogen or a methyl group.

The mode of binding of the alkenyl group to the polyoxyalkylene polymer is not subject to limitation; for example, alkenyl group direct bond, ether bond, ester bond, carbonate bond, urethane bond, urea bond and the like can be included.

As specific examples of the polymer of component A, a polymer represented by the general formula (3):

$$\{H_2C=C(R^{3a})-R^{4a}-O\}_{a_1}R^{5a}$$

wherein $R^{3a}$ is hydrogen or a methyl group; $R^{4a}$ is a divalent hydrocarbon group having 1 to 20 carbon atoms, optionally having one or more ether groups, $R^{5a}$ is a polyoxyalkylene polymer residue; $a_1$ is a positive integer, can be included. As $R^{4a}$ in the formula, specifically, $-CH_2-$, $-CH_2CH_2-$, $-CH_2CH_2CH_2-$, $-CH_2CH(CH_3)CH_2-$, $-CH_2CH_2CH_2CH_2-$, $-CH_2CH_2OCH_2CH_2-$, or $-CH_2CH_2OCH_2CH_2CH_2-$ and the like can be included; for the ease of synthesis, $-CH_2-$ is preferable.

A polymer having an ester bond, represented by the formula (4):

$$\{H_2C=C(R^{3b})-R^{4b}-OCO\}_{a_2}R^{5b}$$

wherein $R^{3b}$, $R^{4b}$, $R^{5b}$ and $a_2$ have the same definitions as those of $R^{3a}$, $R^{4a}$, $R^{5a}$, and $a_1$, respectively, can also be included.

A polymer represented by the formula (5):

$$\{H_2C=C(R^{3c})\}_{a_3}R^{5c}$$

wherein $R^{3c}$, $R^{5c}$ and $a_3$ have the same definitions as those of $R^{3a}$, $R^{5a}$, and $a_1$, respectively, can also be included.

Furthermore, a polymer having a carbonate bond, represented by the formula (6):

$$\{H_2C=C(R^{3d})-R^{4d}-O(CO)O\}_{a_4}R^{5d}$$

wherein $R^{3d}$, $R^{4d}$, $R^{5d}$ and $a_4$ have the same definitions as those of $R^{3a}$, $R^{4a}$, $R^{5a}$ and $a_1$, respectively, can also be included.

It is preferable that at least 1, preferably 1 to 5, more preferably 1.5 to 3, alkenyl groups be present in each molecule of the polymer of component A. If the number of alkenyl groups contained in each molecule of the polymer of component A is less than 1, the curing is insufficient; if the number exceeds 5, the mesh structure becomes so dense that the polymer sometimes fails to exhibit a good adherence. The polymer of component A can be synthesized according to the method described in JP-A-2003-292926, and any commercially available product can be used.

Particularly preferable embodiment of the polymer of component A includes terminal allylated polyoxypropylene wherein an allyl group is bonded to both terminals of polypropylene glycol.

Any component B compound containing two or more hydrosilyl groups on average in each molecule can be used without limitation, as long as it has a hydrosilyl group (a group having an Si—H bond), but from the viewpoint of the ease of obtainment of raw materials and compatibility with the component A, an organohydrogen polysiloxane modified with an organic constituent is particularly preferable. The aforementioned polyorganohydrogen siloxane modified with an organic constituent more preferably has an average of 2 to 8 hydrosilyl groups in each molecule. Specific examples of the structure of the polyorganohydrogen siloxane include linear or cyclic ones represented by, for example, wherein $2 \leq m_1+n_1 \leq 50$, $2 \leq m_1$, and $0 \leq n_1$, $R^{6a}$ is a hydrocarbon group having 2 to 20 carbon atoms in the main chain thereof, optionally comprising one or more phenyl groups, wherein $0 \leq m_2+n_2 \leq 50$, $0 \leq m_2$, and $0 \leq n_2$, $R^{6b}$ is a hydrocarbon group having 2 to 20 carbon atoms in the main chain thereof, optionally comprising one or more phenyl groups, or wherein $3 \leq m_3+n_3 \leq 20$, $2 \leq m_3 \leq 19$, and $0 \leq n_3 < 18$, $R^{6c}$ is a hydrocarbon group having 2 to 20 carbon atoms in the main chain thereof, optionally having one or more phenyl groups, and the like, and ones having two or more of these units, represented by the following:

wherein $1 \leq m_4+n_4 \leq 50$, $1 \leq m_4$, and $0 \leq n_4$, $R^{6d}$ is a hydrocarbon group having 2 to 20 carbon atoms in the main chain thereof, optionally having one or more phenyl groups, $2 \leq b_1$, $R^{8a}$ is a divalent to tetravalent organic group, and $R^{7a}$ is a divalent organic group, but $R^{7a}$ may be absent depending on the structure of $R^{8a}$, wherein $0 \leq m_5+n_5 \leq 50$, $0 \leq m_5$, and $0 \leq m_5$, and $0 \leq n_5$, $R_{6e}$ is a hydrocarbon group having 2 to 20 carbon atoms in the main chain thereof, optionally having one or more phenyl groups, $2 \leq b_2$, $R^{8b}$ is a divalent to tetravalent organic group, and $R^{7b}$ is a divalent organic group, however, $R^{7b}$ may be absent depending on the structure of $R^{8b}$, or wherein $3 \leq m_6+n_6 \leq 50$, $1 \leq m_6$, and $0 \leq n_6$, $R^{6f}$ is a hydrocarbon group having 2 to 20 carbon atoms in the main chain thereof, optionally comprising one or more phenyl groups, $2 \leq b_3$, $R^{8c}$ is a divalent to tetravalent organic group, and $R^{7c}$ is a divalent organic group, however, $R^{7c}$ may be absent depending on the structure of $R^{8c}$, and the like.

The "compound containing two or more hydrosilyl groups on average in each molecule" for component B preferably has good compatibility with the component A and the component C, or good dispersion stability in the system. Particularly, when the viscosity of the entire system is low, use of an ingredient whose compatibility with any of the above-described ingredients is low as the component B sometimes causes phase separation and a curing failure.

As a specific example of the component B having relatively good compatibility with the component A and the component C, or relatively good dispersion stability, the following can be included.

wherein $n_7$ is an integer of not less than 4 and not more than 10, wherein $2 \leq m_8 \leq 10$ and $0 \leq n_8 \leq 5$, $R^{6g}$ is a hydrocarbon group having eight or more carbon atoms.

As specific preferable examples of the component B, polymethylhydrogen siloxane can be included; for assuring compatibility with the component A and adjusting the SiH content, a compound modified with α-olefin, styrene, α-methylstyrene, allylalkyl ether, allylalkyl ester, allylphenyl ether, allylphenyl ester or the like can be included; as an example, the following structure can be included.

wherein $2 \leq m_9 \leq 20$ and $1 \leq n_9 \leq 20$.

The component B can be synthesized by a commonly known method, and any commercially available product can be used.

In the present invention, the component C "hydrosilylation catalyst" is not subject to limitation; an optionally chosen one can be used. As specific examples, chloroplatinic acid; platinum; solid platinum carried by a carrier such as alumina, silica, or carbon black; a platinum-vinylsiloxane complex {for example, $Pt_n(ViMe_2SiOSiMe_2Vi)_m$, $Pt[(MeViSiO)_4]_m$ and the like}; a platinum-phosphine complex {for example, $Pt(PPh_3)_4$, $Pt(PBu_3)_4$ and the like}; a platinum-phosphite complex {for example, $Pt[P(OPh)_3]_4$, $Pt[P(OBu)_3]_4$ and the like}; $Pt(acac)_2$; the platinum-hydrocarbon conjugates described in U.S. Pat. Nos. 3,159,601 and 3,159,662 of Ashby et al.; the platinum alcoholate catalyst described in U.S. Pat. No. 3,220,972 of Lamoreaux et al. and the like can be included. (In these formulas, Me represents a methyl group, Bu represents a butyl group, Vi represents a vinyl group, Ph represents a phenyl group, acac represents an acetylacetonate, and each of n and m represents an integer.)

As examples of catalysts other than platinum compounds, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like can be included.

These catalysts may be used alone, and may be used in combination of 2 kinds or more. With regard to catalyst activity, chloroplatinic acid, a platinum-phosphine complex, a platinum-vinylsiloxane complex, Pt(acac)$_2$ and the like are preferable.

Although the amount of the component C formulated is not subject to limitation, from the viewpoint of assurance of composition potlife and transparency of the cured product (adhesive layer), the amount is generally not more than $1 \times 10^{-1}$ mol, preferably not more than $5.3 \times 10^{-2}$ mol, relative to 1 mol of alkenyl groups in the component A; particularly, from the viewpoint of transparency of the cured product (adhesive layer), the amount is more preferably not more than $3.5 \times 10^{-2}$ mol, particularly preferably not more than $1.4 \times 10^{-3}$ mol. When the amount exceeds $1 \times 10^{-1}$ mol relative to 1 mol of alkenyl groups in the component A, the finally obtained cured product (adhesive layer) is likely to undergo yellowing and the transparency of the cured product (adhesive layer) tends to be damaged. When the amount of the component C formulated is too low, the composition curing speed is slow, and the curing quality tends to be unstable; therefore, the amount is preferably not less than $8.9 \times 10^{-5}$ mol, more preferably not less than $1.8 \times 10^{-4}$ mol.

The composition comprising the above-described components A to C is cured by heating. That is, the alkenyl group of component A (polyoxyalkylene polymer having at least one alkenyl group in each molecule) is hydrosilylated by the hydrosilyl group (group having Si—H bond) of component B (compound containing two or more hydrosilyl groups on average in each molecule) in the presence of a hydrosilylation catalyst (component C) to allow crosslinking to proceed, whereby curing is completed. The cured product is characterized by the ability to exhibit its tacky characteristic (function to adhere to other object) even without addition, or with addition of a small amount, of an adhesiveness-imparting resin. It has low activity, and does not react upon contact with various substances such as water, metal, plastic material and the like.

In a composition comprising components A to C, it is preferable that the hydrosilyl groups of the component B (compound B) be contained (formulated) so that the functional group ratio to the alkenyl groups of the component A (compound A) will be not less than 0.3 and less than 2, more preferably not less than 0.4 and less than 1.8, and still more preferably not less than 0.5 and less than 1.5. When the hydrosilyl groups are contained so that the foregoing functional group ratio will exceed 2, the crosslinking density increases, and it is sometimes impossible to obtain adhesiveness without the addition, or with the addition of a small amount, of an adhesiveness-imparting resin. When the functional group ratio is less than 0.3, crosslinking in the cured product becomes too weak, and retention of characteristics at high temperatures may become difficult.

(Flame Retardant)

In the present invention, the flame retardant is not particularly limited but a halogen-free flame retardant which does not produce a toxic halogen gas, is preferable and, for example, known flame retardants free of halogen atom such as hydrated metal compound based flame retardants, inorganic compound based flame retardants, phosphorus flame retardant, silicone flame retardant, nitrogen compound based flame retardants, organic metal compound based flame retardants and the like can be used. Of these, phosphorus flame retardants are preferable since they can impart flame retardancy and are superior in the suppression of drip during combustion, compatibility to environmental regulation and the like.

Examples of the hydrated metal compound based flame retardant include aluminum hydroxide, magnesium hydroxide, calcium hydroxide and the like. Examples of the inorganic compound based flame retardant include antimony compound, zinc borate, zinc stannate, molybdenum compound, zinc oxide, zinc sulfide, zeolite, titanium oxide, nano filler (montmorillonite (MMT), nano hydrated metal compound, silica), carbon nanotube, calcium carbonate and the like.

Examples of the phosphorus flame retardant include phosphates, aromatic condensed phosphates, ammonium polyphosphates and the like. Specific examples of the phosphate include triphenyl phosphate, tricresyl phosphate (TCP), cresyl diphenyl phosphate (CDP), 2-ethylhexyldiphenyl phosphate, triethyl phosphate (TEP), tri-n-butyl phosphate, trixylenyl phosphate, xylenyl diphenyl phosphate (XDP) and the like. Specific examples of the aromatic condensed phosphate include resorcinol bisdiphenyl phosphate, bisphenol A bis(diphenyl phosphate), resorcinol bisdixylenyl phosphate and the like. Specific examples of the ammonium polyphosphate include ammonium polyphosphate (APP), melamine-modified ammonium polyphosphate and coated ammonium polyphosphate. Here, the coated ammonium polyphosphate is obtained by coating or microcapsulating ammonium polyphosphate with a resin to enhance water resistance. The phosphate, aromatic condensed phosphate and ammonium polyphosphate can be used concurrently. A combined use of phosphate and ammonium polyphosphate is preferable since flame retardancy in both the solid phase and gaseous phase can be achieved by a combination of a flame retardancy effect of a char layer formed by phosphate and a flame retardancy effect of noncombustible gas production by ammonium polyphosphate.

Examples of the silicone flame retardant include dimethylsilicone, amino-modified silicone, epoxy-modified silicone and the like.

Examples of the nitrogen compound based flame retardant include hindered amine compounds, melamine cyanurate, triazine compounds, guanidine compounds and the like.

Examples of the organic metal compound based flame retardant include copper ethylenediaminetetraacetate, calcium perfluorobutanesulfonate and the like.

One or more kinds of the flame retardants can be used in a mixture. While the amount thereof to be used varies depending on the kind of the flame retardant, it is generally preferably not less than 10 parts by weight, more preferably not less than 20 parts by weight, particularly preferably not less than 30 parts by weight, relative to 100 parts by weight of the adhesive, since the effects of flame retardancy, drip suppression by char layer formation and the like can be efficiently achieved. It is preferably not more than 350 parts by weight, more preferably not more than 250 parts by weight, particularly preferably not more than 150 parts by weight, since more superior adhesive property, preservability and the like can be obtained.

(Tackifier Resin)

The pressure-sensitive adhesive layer 1 containing a flame retardant can contain a tackifier resin to improve adhesion to a sealed object and flame retardancy. Examples of the tackifier resin include terpene tackifier resin, phenol tackifier resin, rosin based tackifier resin, petroleum tackifier resin and the like. One or more kinds of tackifier resin can be used.

Examples of the terpene tackifier resin include terpene resins such as α-pinene polymer, β-pinene polymer, dipentene polymer and the like, modified terpene resins (e.g., terpenephenol resin, styrene-modified terpene resin, aromatic-modified terpene resin, hydrogenated terpene resin etc.) obtained by modifying (phenol-modification, aromatic-modification, hydrogenated-modification, hydrocarbon-modification etc.) these terpene resins, and the like.

Examples of the phenol tackifier resin include condensates (e.g., alkylphenol resin, xyleneformaldehyde resin and the like) of various phenols (e.g., phenol, m-cresol, 3,5-xylenol, p-alkylphenol, resorcin etc.) and formaldehyde, resol obtained by addition reaction of the aforementioned phenol with formaldehyde using an alkali catalyst, novolac obtained by condensation reaction of the aforementioned phenol with formaldehyde using an acid catalyst and the like.

Examples of the rosin based tackifier resin include unmodified rosin (natural rosin) such as gum rosin, wood rosin, tall oil rosin and the like, modified rosin (hydrogenated rosin, disproportionated rosin and polymerized rosin, and other chemically-modified rosin etc.) obtained by modifying the above unmodified rosins by hydrogenation, disproportionation, polymerization and the like, various rosin derivatives and the like. Examples of the aforementioned rosin derivative include rosin esters such as modified rosin ester compound obtained by esterifying modified rosin (rosin ester compound obtained by esterifying unmodified rosin with an alcohol, hydrogenated rosin, disproportionated rosin, polymerized rosin and the like) with an alcohol and the like; unsaturated fatty acid-modified rosins obtained by modifying unmodified rosin or modified rosin (hydrogenated rosin, disproportionated rosin, polymerized rosin etc.) with unsaturated fatty acid; unsaturated fatty acid modified rosin ester obtained by modifying rosin ester with an unsaturated fatty acid; rosin alcohols obtained by reduction-treating a carboxyl group in unmodified rosin, modified rosin (hydrogenated rosin, disproportionated rosin, polymerized rosin etc.), unsaturated fatty acid-modified rosins or unsaturated fatty acid-modified rosin esters; metal salts of rosins (particularly, rosin esters) such as unmodified rosin, modified rosin, various rosin derivatives and the like; and the like. In addition, as the rosin derivative, a rosin phenol resin obtained by adding phenol to rosins (unmodified rosin, modified rosin, various rosin derivatives etc.) with an acid catalyst and subjecting same to thermal polymerization and the like can also be used.

Examples of the alcohol to be used for obtaining the above-mentioned rosin esters include divalent alcohols such as ethylene glycol, diethylene glycol, propylene glycol, neopentyl glycol and the like, trivalent alcohols such as glycerol, trimethylolethane, trimethylolpropane and the like, tetravalent alcohols such as pentaerythritol, diglycerol and the like, hexahydric alcohols such as dipentaerythritol etc. and the like. These are used alone or in a combination of two or more kinds thereof.

Examples of the petroleum tackifier resin include known petroleum resins such as aromatic petroleum resin, aliphatic petroleum resin, alicyclic petroleum resin (aliphatic cyclic petroleum resin), aliphatic aromatic petroleum resin, aliphatic alicyclic petroleum resin, hydrogenated petroleum resin, coumarone resin, coumarone indene resin and the like. Specific examples of the aromatic petroleum resin include polymers using one or more kinds of vinyl group-containing aromatic hydrocarbon having 8 to 10 carbon atoms (styrene, o-vinyltoluene, m-vinyltoluene, p-vinyltoluene, α-methylstyrene, β-methylstyrene, indene, methylindene etc.) and the like. As the aromatic petroleum resin, an aromatic petroleum resin obtained from a fraction such as vinyltoluene, indene and the like (i.e., "C9 petroleum fraction") (namely, "C9 based petroleum resin") can be used preferably. Examples of the aliphatic petroleum resin include polymers obtained by using one or more kinds selected from dienes such as olefin having 4 or 5 carbon atoms (e.g., butene-1, isobutylene, pentene-1 etc.), butadiene, piperylene, 1,3-pentadiene, isoprene etc., and the like. Furthermore, as the aliphatic petroleum resin, an aliphatic petroleum resin obtained from a fraction such as butadiene, piperylene, isoprene and the like (i.e., "C4 petroleum fraction", "C5 petroleum fraction" etc.) (namely, "C4 based petroleum resin", "C5 based petroleum resin" etc.) can be used preferably. Examples of the alicyclic petroleum resin include an alicyclic hydrocarbon resin obtained by cyclization and dimerization of an aliphatic petroleum resin (i.e., "C4 based petroleum resin", "C5 based petroleum resin" etc.), followed by polymerization, a polymer of a cyclic diene compound (cyclopentadiene, dicyclopentadiene, ethylidenenorbornane, dipentene, ethylidenebicycloheptene, vinylcycloheptene, tetrahydroindene, vinylcyclohexene, limonene etc.) or a hydrogenated resin thereof, an alicyclic hydrocarbon resin obtained by hydrogenating the aromatic ring of the aforementioned aromatic hydrocarbon resin, the following aliphatic aromatic petroleum resin and the like. Examples of the aliphatic aromatic petroleum resin include a styrene-olefin copolymer and the like. In addition, as the aliphatic aromatic petroleum resin, a so-called "C5/C9 copolymerization petroleum resin" and the like can be used.

The tackifier resin is preferably terpene tackifier resin and/or rosin based tackifier resin, particularly preferably rosin based tackifier resin, from the aspect of flame retardancy of sealing sheet. The terpene tackifier resin and rosin based tackifier resin easily provide effect as flame retardant auxiliary agents. Using these, adhesion of a sealing sheet to a sealed object and flame retardancy of a sealing sheet can be improved more remarkably. The terpene tackifier resin is particularly preferably a terpenephenol resin, the rosin based tackifier resin is particularly preferably rosin ester (i.e., esterified compound of unmodified rosin, hydrogenated rosin, disproportionated rosin or polymerized rosin), and the rosin ester is preferably trivalent or higher polyhydric alcohol ester, particularly preferably tetra to hexahydric polyhydric alcohol ester.

One or more kinds of the tackifier resins can be used in combination, and the amount thereof to be used is not particularly limited. However, it is preferably not less than parts by weight, more preferably not less than 10 parts by weight, particularly preferably not less than 15 parts by weight, relative to 100 parts by weight of the adhesive, since it becomes a carbon source and sufficiently exhibits the effect of a phosphorus flame retardant as an auxiliary agent. From the aspects of maintenance of adhesive property, preservability, handling property, dispersibility and the like, it is preferably not more than 100 parts by weight, more preferably not more than 60 parts by weight, particularly preferably not more than 40 parts by weight.

The pressure-sensitive adhesive layer 1 can contain, where necessary, various additives such as plasticizer, filler made of glass fiber, glass bead, metal powder or other inorganic powder etc., pigment, colorant, antioxidant, UV absorber and the like.

When the sealing sheet of the present invention has a substrate sheet 4, an adhesion-imparting agent can be added to the flame retardant-containing adhesive layer 1 to increase the adhesiveness to the substrate sheet 4. Examples of the adhesion promoter include various silane coupling agents, epoxy resin and the like. Of these, silane coupling agents having a functional group such as an epoxy group, a methacryloyl group, a vinyl group and the like are preferable since they are effective for expression of adhesiveness. In addition, a catalyst for reacting a silyl group and an epoxy group can be added concurrently with a silane coupling agent and an epoxy resin. When a polyoxyalkylene adhesive (adhesive consisting of a cured product of a composition containing the above-mentioned components A-C) is used, such catalyst should be selected in consideration of the influence on the curing reaction (hydrosilylation reaction) to produce the adhesive.

When a polyoxyalkylene adhesive (adhesive composed of a cured product of a composition containing the above-mentioned components A-C) is used as an adhesive, it may contain a storage stability improving agent to improve the storage stability. As the storage stability improving agent, a compound commonly known as a storage stabilizer for the component B of the present invention can be used without limitation. For example, a compound comprising an aliphatic unsaturated bond, an organic phosphorus compound, an organic sulfur compound, a nitrogen-containing compound, a tin compound, an organic peroxide and the like can be suitably used. Specifically, 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, vitamin E, 2-(4-morpholinyldithio)benzothiazole, 3-methyl-1-butene-3-ol, 2-methyl-3-butene-2-ol, organosiloxane containing an acetylenic unsaturated group, acetylene alcohol, 3-methyl-1-butyl-3-ol, diallyl fumarate, diallyl maleate, diethyl fumarate, diethyl maleate, dimethyl maleate, 2-pentenenitrile, 2,3-dichloropropene and the like can be included, but these are not to be construed as limitative.

While the thickness of the flame retardant-containing adhesive layer 1 of the flame retardant adhesive sheet 3 is not particularly limited, when the flame retardant adhesive sheet 3 is formed using the single flame retardant-containing adhesive layer 1 shown in FIG. 2, it is preferably not less than 200 μm, more preferably not less than 300 μm, from the aspects of seal performance and the like. Moreover, from the aspects of moisture permeability resistance, cutting suitability and the like, it is preferably not more than 1200 μm, more preferably not more than 1000 μm.

On the other hand, when the flame retardant adhesive sheet 3 has the flame retardant-containing adhesive layer 1 on both surfaces of the core film 2, as shown in FIG. 1 (i.e., laminate structure of flame retardant-containing adhesive layer 1/core film 2/flame retardant-containing adhesive layer 1), the total thickness of the two flame retardant-containing adhesive layers sandwiching the core film 2 is preferably not less than 200 μm, more preferably not less than 300 μm, from the aspects of the seal performance of the sealing sheet and the like. From the aspects of moisture permeability resistance, cutting suitability and the like, it is preferably not more than 1200 μm, more preferably not more than 1000 μm. The layer thickness of the two flame retardant-containing adhesive layers sandwiching the core film 2 may be the same or different, but preferably the same to reduce the cost by simplifying the production step.

The sealing sheet is cut into a desired size according to the application site by a cutting device such as a score rewinding device and the like before use. The above-mentioned cutting suitability means processability in such cut processing. When the thickness of the flame retardant-containing adhesive layer 1 exceeds 1200 μm, inconveniences such as glue extrusion, blocking and the like may easily occur in cut processing.

<Core Film>

The material of core film 2 is not particularly limited. Examples thereof include a single layer or laminate plastic film made from one or more kinds selected from polyester (e.g., poly(ethylene terephthalate) (PET) and the like); nylon; polyvinyl chloride; polyvinylidene chloride; polyolefin (e.g., polyethylene, polypropylene, reactor TPO, ethylene-vinyl acetate copolymer and the like); fluororesin (e.g., polytetrafluoroethylene (PTFE), polychlorotrifluoroethylene (PCTFE), polyvinylidene fluoride (PVDF), polyvinyl fluoride (PVF), perfluoroalkoxy fluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like) and the like, a metal foil, and the like. Also, it may be a film obtained by laminating a plastic film and a metal foil. The core film is preferably a nonporous film. The "nonporous film" means a solid film excluding mesh cloth, woven fabric, non-woven fabric, mesh film (sheet), perforated film (sheet) and the like.

The sealing sheet of the present invention is generally preserved as a roll-shaped object until use. Therefore, the produced sealing sheet is wound in a roll shape. When the core film has a large thickness, the core film 2 and the flame retardant-containing adhesive layer 1 are partially separated to form air gap during a sealing sheet winding work, which leads to low seal performance and degraded appearance of the sealing sheet. Therefore, from the aspects of the appearance of the sealing sheet, seal performance of the sealing sheet, the positioning workability of the sealing sheet when mounting the sealing sheet and the like, the thickness of the core film 2 is preferably comparatively thin. Although it varies depending on the material of the film, the thickness of the core film 2 is generally preferably not more than 70 μm and not more than 40 μm. When the thickness of the core film 2 is too thin, the seal performance tends to be low, the re-peeling workability tends to be low, adhesion tends to fail and the like. Therefore, the thickness of the core film 2 is preferably not less than 10 μm, more preferably not less than 12 μm.

[Substrate Sheet]

The sealing sheet of the present invention encompasses both embodiments of having or not having a substrate sheet 4. In the embodiments having a substrate sheet 4, the substrate sheet 4 imparts a sealing sheet with self-supporting property, improves the installing workability of the sealing sheet, as well as improves the moisture permeability resistance of the sealing sheet.

As substrate sheet 4, a film having not only heat resistance required of a sealing sheet but also superior water-repellency, and/or comprising a material having high resistance to moisture permeability is preferable. For example, plastic sheets made of fluororesins such as polytetrafluoroethylene (PTFE), polychlorotrifluoroethylene (PCTFE), polyvinylidene fluoride (PVDF), polyvinyl fluoride (PVF), perfluoroalkoxyfluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like, are preferable, a fluororesin sheet is particularly preferable, and a polytetrafluoroethylene (PTFE) sheet is especially preferable.

The thickness of the substrate film 4 is preferably 30-200 μm, more preferably 80-150 μm, to achieve good adhesion of a sealing sheet to an object to be sealed and improved detach workability for maintenance.

In addition, the surface of the substrate film 4 on the side of the flame retardant-containing adhesive layer 1 is preferably subjected to a corona treatment, a sputter treatment, a sodium treatment and the like for the improvement of adhesiveness between the flame retardant-containing adhesive layer 1 and the substrate sheet 4, and two or more of these surface treatments can be performed in combination.

[Primer Layer]

When the flame retardant adhesive sheet 3 has a laminate structure of flame retardant-containing adhesive layer 1/core film 2/flame retardant-containing adhesive layer 1 as shown in FIG. 1, a primer layer can be formed on the surface of the core film 2 (at least one surface). When the primer layer is formed, the binding force between the core film 2 and the flame retardant-containing adhesive layer 1 increases, and therefore, the moisture permeability resistance of the sealing sheet can be further improved. In addition, formation of air gap between the core film 2 and the flame retardant-containing adhesive layer 1 can be prevented at a higher level when winding the sealing sheet after production in a roll shape (to produce a roll-shaped sealing sheet), and when drawing out the sealing sheet (unwinding) from a roll-shaped sealing sheet and mounting same on a sealed object. Such primer layer can be formed not only on one surface of the core film 2 but also both surfaces of the core film 2. When a sealing sheet has a substrate sheet 4, it is preferably formed on one surface on the opposite side from the substrate sheet 4 of the core film 2. When the primer layer 6 is formed on one surface on the opposite side from the substrate sheet 4 of the core film 2, the core film 2 is not separated from the flame retardant-containing adhesive layer 1 adhered to the sealed object when the sealing sheet is detached from the sealed object, and detachment occurs between the flame retardant-containing adhesive layer 1 on the substrate sheet 4 and the core film 2. As a result, only the flame retardant-containing adhesive layer 1 does not remain on the sealed object, and the flame retardant-containing adhesive layer 1 and the core film 2 integrally remain. Therefore, an operation to detach and recover the flame retardant-containing adhesive layer 1 from the sealed object becomes easy.

The primer layer is not particularly limited as long as it can enhance the binding force between the core film 2 and the adhesive layer 1 containing a halogen-free flame retardant. Examples thereof include polyester polyurethane; chlorinated hydrocarbon resin such as chlorinated polypropylene and the like; acrylic polymer or the like, with preference given to polyester polyurethane. While the polyester polyurethane is not particularly limited, it is, for example, obtained by urethane modification of polyester having two or more hydroxy groups with a polyisocyanate compound (bifunctional or more isocyanate compound).

As a method of modifying urethane, a method including dissolving a polyester having two or more hydroxy groups in an organic solvent unreactive with a polyisocyanate compound, adding a polyisocyanate compound thereto, adding as necessary an amine compound, adding a reaction catalyst such as an organic metal compound and the like, and heating the mixture.

Examples of the polyester having two or more hydroxy groups, which is used for the production of polyester polyurethane, include polyester obtained by reacting a dibasic acid such as terephthalic acid, isophthalic acid, adipic acid, azelaic acid, sebacic acid and the like or dialkylesters thereof or a mixture thereof with, for example, glycol such as ethylene glycol, propylene glycol, diethylene glycol, butyleneglycol, neopentylglycol, 1,6-hexanediol, 3-methyl-1,5-pentanediol, 3,3'-dimethylolheptane, polyoxyethyleneglycol, polyoxypropyleneglycol, polytetramethyleneetherglycol and the like or a mixture thereof; and polyester obtained by subjecting lactone such as polycaprolactone, polyvalerolactone, poly(β-methyl-γ-valerolactone) and the like to ring opening polymerization. One or more kinds thereof can be used.

Examples of the polyisocyanate compound used for the production of polyester polyurethane include alicyclic, aromatic, aliphatic diisocyanate compounds. Examples of the alicyclic diisocyanate include cyclohexane-1,4-diisocyanate, isophorone diisocyanate, norbornane diisocyanate, dicyclohexylmethane-4,4'-diisocyanate, 1,3-bis(isocyanatemethyl)cyclohexane, methylcyclohexanediisocyanate and the like.

Examples of the aromatic diisocyanate include 1,5-naphthylene diisocyanate, 4,4'-diphenylmethane diisocyanate, 4,4'-diphenyldimethylmethane diisocyanate, 4,4'-dibenzylisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, m-tetramethylxylylene diisocyanate and the like.

Examples of the aliphatic diisocyanate include butane-1,4-diisocyanate, hexamethylenediisocyanate, isopropylenediisocyanate, methylenediisocyanate, 2,2,4-trimethylhexamethylenediisocyanate, lysinediisocyanate, dimer diisocyanate wherein the carboxyl group of dimer acid is converted to an isocyanate group and the like.

As the polyisocyanate compound, a polyisocyanate compound of tri- or higher functional such as adduct, isocyanurate, buret and the like can also be used. As the polyisocyanate compound, a diisocyanate compound is a preferable embodiment since it is not easily gelated.

One or more kinds of polyester polyurethane can be used in combination.

The thickness of the primer layer is preferably 0.1-10 μm, more preferably 0.5-5 μm. Such thickness can sufficiently enhance the binding force between the core film 2 and the flame retardant-containing adhesive layer 1.

In the sealing sheet of the present invention, the production method of the flame retardant adhesive sheet 3 is not particularly limited, and a conventional production method of a double-faced adhesive sheet can be employed. For example, for a flame retardant adhesive sheet using an acrylic adhesive, which is a laminate of flame retardant-containing adhesive layer 1/core film 2/flame retardant-containing adhesive layer 1 (FIG. 1), for example, a method wherein a photopolymerizable composition containing a monomer for main skeleton of a base polymer, a copolymerizable monomer, a radical polymerization initiator, a crosslinking agent and the like is mixed with a flame retardant, the mixture is applied to one surface of a core film to form a coated film with a given thickness, a release-treated surface of a release sheet is adhered thereon, and the resultant product is subjected to UV irradiation to allow a polymerization reaction to proceed, thereby forming one flame retardant-containing adhesive layer 1, and further, the other flame retardant-containing adhesive layer 1 is formed on the other surface of the core film by a similar process can be employed. When the flame retardant adhesive sheet 3 is composed of the single flame retardant-containing adhesive layer 1 (FIG. 2), a method wherein a photopolymerizable composition comprising a monomer for the main skeleton of a base polymer, a copolymerizable monomer, a radical polymerization initiator, a crosslinking agent and the like is further blended with a flame retardant, the mixture is applied to a peel treated surface of a suitable release sheet to form a coated film with a given thickness, a peel treated surface of another release sheet is adhered thereto, and UV is irradiated to make the polymerization reaction proceed, whereby a flame retardant-containing adhesive layer 1 is formed, can be mentioned. When the flame retardant-containing adhesive layer contains a tackifier resin and other additives, they can be mixed with the photopolymerizable composition together with a flame retardant.

On the other hand, for a flame retardant-containing adhesive sheet using a silicone adhesive 3, which is a laminate of flame retardant-containing adhesive layer 1/core film 2/flame retardant-containing adhesive layer 1 (FIG. 1), for example, a method wherein a silicone adhesive containing a m flame retardant is applied to one surface of a core film to form a coated film, a release-treated surface of a release sheet is adhered thereon, and the resultant product is subjected to given heat-drying, thereby forming one flame retardant-containing adhesive layer 1, and further, the other flame retardant-containing adhesive layer is formed on the other surface of the core film 2 by a similar process can be employed. When the flame retardant adhesive sheet 3 is composed of the single flame retardant-containing adhesive layer 1 (FIG. 2), a method wherein a silicone adhesive containing a flame retardant and the like is applied to a peel treated surface of a suitable release sheet to form a coated film with a given thickness, which is subjected to given heat-drying, whereby a flame retardant-containing adhesive layer 1 is formed, can be mentioned. When the flame retardant-containing adhesive layer contains a tackifier resin and other additives, they can be mixed with the silicone adhesive together with a halogen-free flame retardant.

A pressure-sensitive adhesive sheet containing a flame retardant, which uses an acrylic adhesive, and a pressure-sensitive adhesive sheet containing a flame retardant, which uses a silicone adhesive, can be produced by appropriately using a general release agent such as silicone release agent, fluorine release agent and the like for the detach treatment of a release sheet.

For example, a flame retardant-containing adhesive sheet using a polyoxyalkylene adhesive can be produced by the following method. When a flame retardant-containing adhesive sheet 3 is a laminate of flame retardant-containing adhesive layer 1/core film 2/flame retardant-containing adhesive layer 1 (FIG. 1), for example, the aforementioned components A-C and a flame retardant (Component D) are stirred in a stirrer, and subjected to static defoaming at a liquid temperature of 25° C. for 48-96 hr to give a defoamed mixture (composition). When a tackifier resin and other additives are contained in a pressure-sensitive adhesive sheet containing a flame retardant, a tackifier resin and other additives are added together with the above-mentioned components A-D to give a mixture (composition). Then, a composition (mixture) containing components A-D after the defoaming treatment is applied on the detach-treated surface of a release sheet to form a coated film with a desired thickness. The other surface of the core film is adhered thereto, and a given heat treatment is applied to cure the composition (mixture) containing components A-D. The curing reaction is completed since the alkenyl group of component A (polyoxyalkylene polymer having at least one alkenyl group in each molecule) is hydrosilylated by the hydrosilyl group (group having Si—H bond) of component B (compound containing two or more hydrosilyl groups on average in each molecule) in the presence of a hydrosilylation catalyst (component C) to allow crosslinking to proceed, whereby one flame retardant-containing adhesive layer can be formed. The other flame retardant-containing adhesive layer is formed on the other surface of the core film by a similar process.

The mixture can be applied to for example, a commonly known coating apparatus such as a gravure coater; a roll coater such as a kiss coater or a comma coater; a die coater such as a slot coater or a fountain coater; a squeeze coater, a curtain coater and the like. Regarding the heat treatment conditions in this case, it is preferable that the composition be heated at 50 to 200° C. (preferably 100 to 160° C.) for about 0.01 to 24 hours (preferably 0.05 to 4 hours). While the defoaming time varies depending on the amount of a mixture to be treated, for example, when the mixture is defoamed by standing, the temperature of the mixture is generally preserved at 25° C., and preferably applied after standing for about 48-96 hr.

Release agent include silicone type release treatment agent, fluoride type release treatment agent, long chain alkyl type release treatment agent etc. can be applied to the support surface. Of these, a silicone type release treatment agent is preferable. As the curing method, a curing method such as UV irradiation, electron beam irradiation and the like are preferably used. Furthermore, of the silicone type release treatment agents, a cation polymerizable UV curing silicone type release treatment agent is preferable. A cation polymerizable UV curing silicone type release treatment agent is a mixture of a cation polymerizable silicone (polyorganosiloxane having an epoxy functional group in a molecule) and an onium salt photoinitiator. Such agent wherein the onium salt photoinitiator is a boron photoinitiator is particularly preferable. Using such a cation polymerizable UV curing silicone type release treatment agent wherein the onium salt photoinitiator is a boron photoinitiator, particularly good releaseability (mold releaseability) can be obtained. A cation polymerizable silicone (polyorganosiloxane having an epoxy functional group in a molecule) has at least two epoxy functional groups in one molecule, which may be linear or branched chain, or a mixture of these. While the kind of an epoxy functional group contained in polyorganosiloxane is not particularly limited, it only needs to permit progress of cationic ring-opening polymerization by an onium salt photoinitiator. Specific examples thereof include γ-glycidyloxypropyl group, β-(3,4-epoxycyclohexyl)ethyl group, β-(4-methyl-3,4-epoxycyclohexyl)propyl group and the like. Such cation polymerizable silicone (polyorganosiloxane having an epoxy functional group in a molecule) is marketed and a commercially available product can be used. For example, UV9315, UV9430, UV9300, TPR6500, TPR6501 and the like manufactured by Toshiba Silicone Co., Ltd., X-62-7622, X-62-7629, X-62-7655, X-62-7660, X-62-7634A and the like manufactured by Shin-Etsu Chemical Co., Ltd., Poly200, Poly201, RCA200, RCA250, RCA251 and the like manufactured by Arakawa Chemical Industries, Ltd.

Of the cationic polymerizable silicones, polyorganosiloxane comprising the following structural units (A)-(C) is particularly preferable.

(A)

(B)

(C)

In polyorganosiloxane comprising such structural units (A)-(C), the composition ratio ((A):(B):(C)) of structural units (A)-(C) is particularly preferably 50-95:2-30:1-30 (mol %), and especially preferably 50-90:2-20:2-20 (mol %). Polyorganosiloxane comprising such structural units (A)-(C) is available as Poly200, Poly201, RCA200, X-62-7622, X-62-7629 and X-62-7660.

On the other hand, as the onium salt photoinitiator, a known product can be used without particular limitation. Specific examples include a compound represented by $(R^1)_2I^+X^-$, $ArN_2^+X^-$ or $(R^1)_3S^+X^-$ (wherein $R^1$ is alkyl group and/or aryl group, Ar is aryl group, $X^-$ is $[B(C_6H_5)_4]^-$, $[B(C_6F_5)_4]^-$, $[B(C_6H_4CF_3)_4]^-$, $[(C_6F_5)_2BF_2]^{31}$, $[C_6F_5BF_3]^-$, $[B(C_6H_3F_2)_4]^-$, $BF_4^-$, $PF_6^-$, $AsF_6^-$, $HSO_4^-$, $ClO_4^-$ and the like). Of these, a compound of the formula (boron photoinitiator) wherein $X^-$ is $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$ or $BF_4^-$ is preferable, and a compound represented by $(R^1)_2I^+[B(C_6F_5)_4]^-$ (wherein $R^1$ is substituted or unsubstituted phenyl group) (alkyl iodonium, tetrakis(pentafluorophenyl)borate) is particularly preferable. As the onium salt photoinitiator, antimony (Sb) initiator is conventionally known. However, when an antimony (Sb) initiator is used, peel strength becomes heavier and peeling of transparent pressure-sensitive adhesive sheet from the release sheet tends to be difficult.

While the amount of the onium salt photoinitiator to be used is not particularly limited, it is preferably about 0.1-10 parts by weight relative to 100 parts by weight of the cationic polymerizable silicone (polyorganosiloxan). When the amount of use is smaller than 0.1 part by weight, curing of the silicone release layer may become insufficient. When the amount of use is greater than 10 parts by weight, the cost becomes impractical. When a cationic polymerizable silicone (polyorganosiloxan) and an onium salt photoinitiator are mixed, the onium salt photoinitiator may be dissolved or dispersed in an organic solvent and then mixed with polyorganosiloxan. Specific examples of the organic solvent include alcohol solvents such as isopropyl alcohol, n-butanol and the like; ketone solvents such as acetone, methylethyl ketone and the like; ester solvents such as ethyl acetate, and the like, and the like.

A detach treatment agent can be applied, for example, using a general coating apparatus such as those used for roll coater method, reverse coater method, doctor blade method and the like. While the coating amount (solid content) of the detach treatment agent is not particularly limited, it is generally about 0.05-6 mg/cm².

Figure 6:
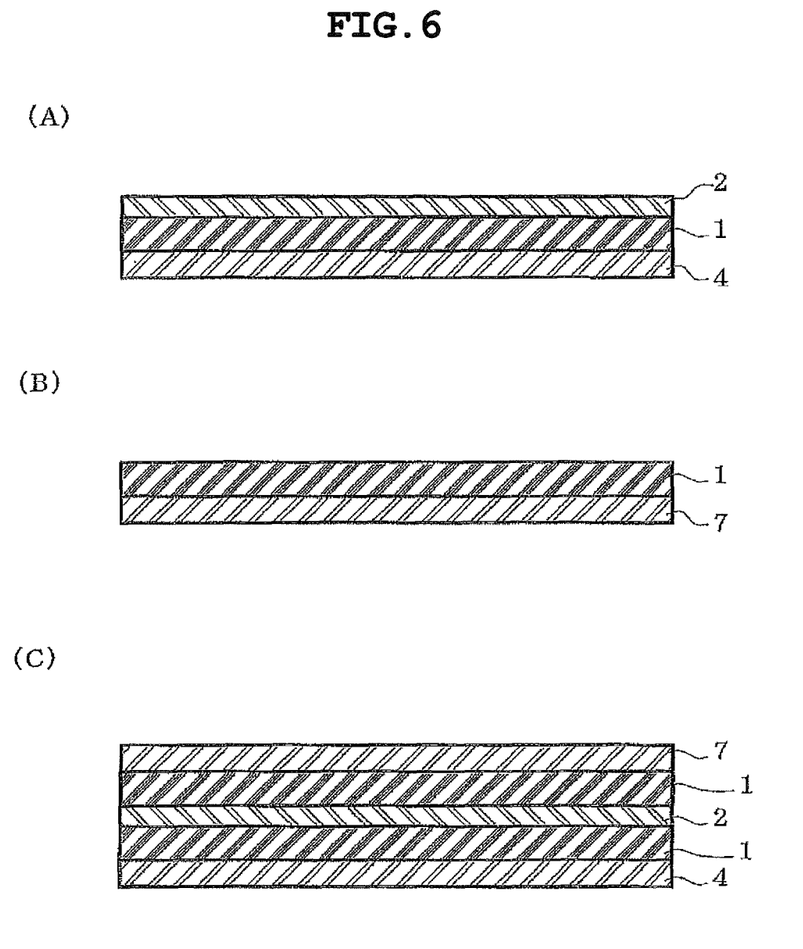

When a sealing sheet wherein the flame retardant adhesive sheet 3 is a laminate of flame retardant-containing adhesive layer 1/core film 2/flame retardant-containing adhesive layer 1, and contains a substrate sheet 4 (sealing sheet 10 of FIG. 1) is produced, the method shown in the following FIG. 6 is preferable.

First, a flame retardant-containing adhesive layer 1 is formed on one surface of a substrate sheet 4, and a core film 2 is adhered to the flame retardant-containing adhesive layer 1 (FIG. 6(A)).

A release sheet 7 is prepared, and the flame retardant-containing adhesive layer 1 is formed on one surface of the release sheet 7 (FIG. 6(B)).

The flame retardant-containing adhesive layer 1 formed on one surface of the above-mentioned release sheet 7 is press adhered to one surface of the core film 2 (adhesive layer non-formed surface) (FIG. 6(C)). The press condition therefor is preferably about 0.5-5 kgf/cm².

Figure 7:
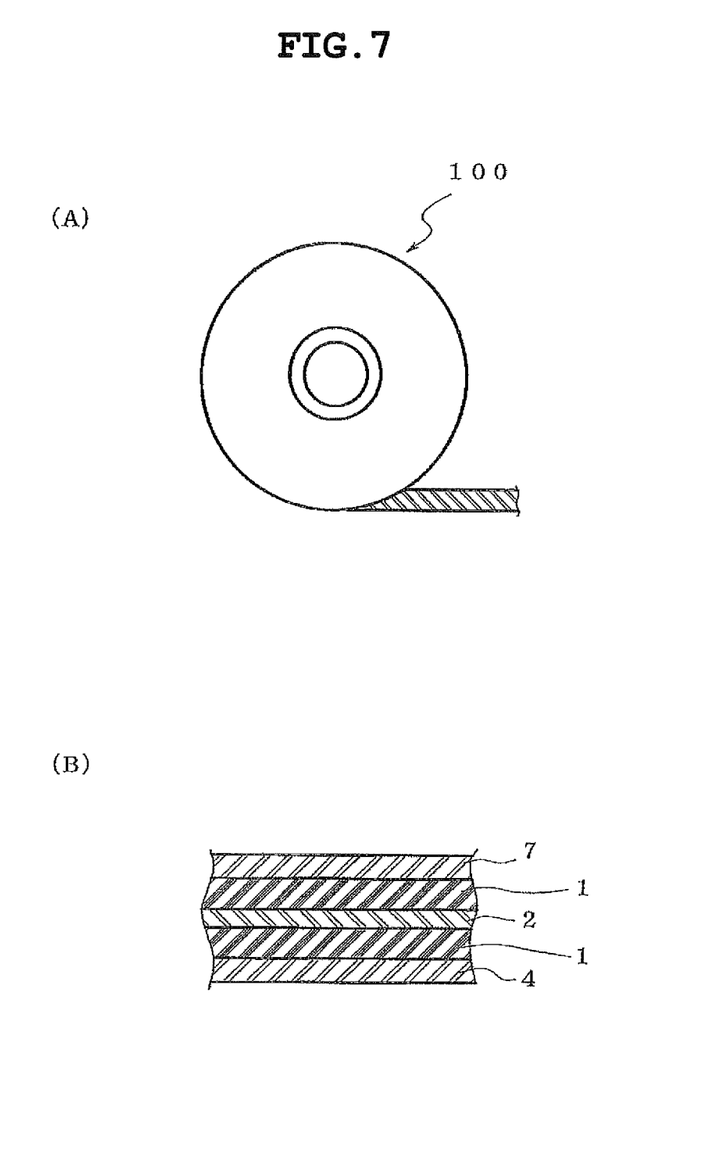
FIG. 7(A) is a schematic view of a roll shape of the sealing sheet of the present invention.
FIG. 7(B) is a partly-enlarged sectional view of the sealing sheet shown in FIG. 7(A).

The sealing sheet of the present invention is preferably preserved as a roll-shaped object (roll-shaped sealing sheet) 100, as shown in FIG. 7(A) and FIG. 7(B), before being adhered to the surface of a sealing object (sealed object). In this case, a substrate sheet 4 having a peel-treated back face (one surface on the opposite side from the flame retardant-containing adhesive sheet 5 of the substrate sheet 4) is used.

In the sealing sheet of the present invention, as shown in FIG. 5, when sealing sheets 10, 11 are interposed between two sealed objects 20, 21, the two sealed objects 20, 21 having sealing sheets 10, 11 interposed therebetween can be fixed by bolting.

The sealing sheet of the present invention is useful as a sealing sheet required to have flame retardance such as a sealing sheet to be applied to a surface of an outer plate of aircraft, car, train and the like, a surface of a member inside aircraft, car, train and the like, which needs to have its surface isolated from humidity and water (salt water), a gap between two members in aircraft, car, train and the like, which is to be isolated from humidity and water (salt water), and the like. In addition, since the sealing sheet of the present invention shows not only high flame retardance but also good seal performance to isolate a metal plate from humidity and water (salt water) by simple adhesion to the surface of the metal plate, it affords a high corrosion preventive effect capable of preventing corrosion of a metal plate that is easily corroded such as a duralumin plate.

The present invention is explained in more detail in the following by referring to Examples and Comparative Examples. The property evaluation (test) of the sealing sheet in the Examples and Comparative Examples was performed according to the following methods.

1. Constant Load Detachment Test

A sealing sheet is cut into a tape (10 mm width×50 mm length), and the adhesive surface of this tape is pressed against a duralumin panel (JIS standard: A7075) with a 5 kgf roller. The roller runs from one end of the tape in the longitudinal direction to the other end (one-way press). The thus-obtained sample is left standing at ambient temperature (humidity: 50% RH) for 24 hr, a load (plummet) (30 g) is attached to one end of the tape, and the time until the detached distance of the tape reaches 30 mm is measured.

2. Combustion Test (1) Horizontal Combustion Test test sample: width 3 inch×length 10 inch test atmosphere: air firing time: 15 seconds test procedure: A test sample is held horizontally using a stainless frame (flat plane and the vertical direction of the test sample are in an orthogonal relation), one end of the test sample is kept in contact with the flame for 15 seconds, and the combustion time is measured.

standard: combustion time not more than 12 seconds (2) Perpendicular Flame Retardance Test test sample: width 3 inch×length 10 inch test atmosphere: in air time to ignition: 12 seconds test procedure: A test sample is held perpendicular disposed (flat plane and the vertical direction of the test sample are in a parallel relation), a lower end of the test sample is kept in contact with the flame for 12 seconds, and the combustion time is measured.

standard: combustion time not less than 20 seconds

3. Corrosion Resistance Test (Sealability Evaluation Test)

A sealing sheet is cut into a 2 inch×2 inch flat plane size, and adhered to a 4 inch×4 inch (flat plane size) duralumin panel (A7075). After one reciprocation with a 5 kgf roller, the sheet is aged for 24 hr at ambient temperature to give a test sample, and the test sample is subjected to a salt water spray test under the following conditions.

salt water spray test (according to ASTM B117)

sample set angle: 30° temperature: 35+1.1-1.7° C.

salt water concentration: 5 wt % spray amount: 1.5 ml/80 cm$^2$/hr test time: 600 hr seal performance evaluation: After the test, the sealing sheet is detached from the duralumin panel, and the ratio of the corroded area to the whole area of the region, to which the sealing sheet has been adhered, is determined. The corrosion is determined by visual observation.

EXAMPLE 1

A thermosetting ordinary temperature liquid resin (manufactured by Kaneka Corporation, trade name "ACX022", 100 parts by weight) composed of terminal allylated polyoxypropylene wherein an allyl group is bonded to both ends of polypropyleneglycol having an average molecular weight of about 28000 is mixed with a tackifier resin (rosin pentaerythritol, 15 parts by weight), and the mixture was heated to 100° C. and stirred for 30 min. It was confirmed that the mixture is transparent and the tackifier resin is dissolved in the thermosetting ordinary temperature liquid resin. Thereto were added a curing catalyst (0.05 parts by weight) composed of a solution of platinum/1,3-divinyltetramethyldisiloxane complex in 2-propanol (complex concentration 3%, manufactured by N.E. CHEMCAT Corporation, product name "3% Pt-VTS-IPA solution"), a curing agent (7.65 parts by weight) composed of a hydrogen siloxane compound (manufactured by Kaneka Corporation, trade name "CR500") having 5 hydrosilyl groups on average in a molecule, a flame retardant (ammonium polyphosphate (APP), 50 parts by weight), and tricresylphosphate (TCP) (30 parts by weight) and the mixture was mixed by stirring. Thereafter, static defoaming was performed at a liquid temperature of 25° C. for 60 hr to give a uniform composition.

The above-mentioned adhesive composition was applied to a 135 μm-thick PTFE sheet such that the thickness after a heat treatment was 400 μm, the sheet was heat-treated at 130° C. for 10 min, and a 20 μm-thick polypropylene film was layered thereon to give the first adhesive sheet.

The above-mentioned adhesive composition was applied onto a peel-treated surface of a release sheet composed of a poly(ethylene terephthalate) film such that the thickness after a heat treatment was 400 μm. The sheet was heat-treated at 130° C. for 10 min, and a peel-treated surface of a release sheet composed of a poly(ethylene terephthalate) was layered thereon to give the second adhesive sheet.

The release sheet of the second adhesive sheet was detached to expose the adhesive layer, and the adhesive layer was adhered to the first adhesive sheet (polypropylene film) to complete a sealing sheet.

EXAMPLE 2

In the same manner as in Example 1 except that the conditions of the static defoaming in the preparation of the adhesive composition were changed to a liquid temperature of 25° C. for 48 hr, a sealing sheet was obtained.

EXAMPLE 3

In the same manner as in Example 1 except that the conditions of the static defoaming were changed to a liquid temperature of 25° C. for 72 hr, a sealing sheet was prepared. The adhesive composition was applied onto a 135 μm-thick PTFE sheet such that the thickness after a heat treatment was 800 μm. A peel-treated surface of a release sheet composed of a poly(ethylene terephthalate) was layered thereon, and the sheet was heat-treated at 130° C. for 10 min to give a sealing sheet having a total thickness of 935 μm.

COMPARATIVE EXAMPLE 1

In the same manner as in Example 1 except that a tackifier resin (rosin pentaerythritol) was not used, the amount of the flame retardant (tricresylphosphate (TCP)) was changed to 20 parts by weight, and the defoaming treatment was changed to a reduced pressure defoaming treatment by a stirrer equipped with a vacuum device at a liquid temperature of 25° C. under reduced pressure of 3 kPa or lower for about 2 hr, an adhesive composition was prepared. Using the adhesive composition and in the same manner as in Example 1, the first adhesive sheet and the second adhesive sheet were formed. The release sheet of the second adhesive sheet was detached to expose the adhesive layer, and the adhesive layer was adhered to the first adhesive sheet (polypropylene film) to complete a sealing sheet.

COMPARATIVE EXAMPLE 2

In the same manner as in Example 1 except that the amount of the tackifier resin (rosin pentaerythritol) was changed to 15 parts by weight, and the defoaming treatment was changed to a reduced pressure defoaming treatment by a stirrer equipped with a vacuum device at a liquid temperature of 25° C. under reduced pressure of 3 kPa or lower for about 2 hr, an adhesive composition was prepared. Using the adhesive composition and in the same manner as in Example 1, the first adhesive sheet and the second adhesive sheet were formed. The release sheet of the second adhesive sheet was detached to expose the adhesive layer, and the adhesive layer was adhered to the first adhesive sheet (polypropylene film) to complete a sealing sheet.

COMPARATIVE EXAMPLE 3

In the same manner as in Example 1 except that the conditions of the static defoaming were changed to a liquid temperature of 25° C. for 24 hr, a sealing sheet was obtained.

Each of the sealing sheets of Examples 1-3 and Comparative Examples 1-3 were subjected to the aforementioned tests. The results thereof are shown in the following Table 1. In Table 1, the numbers in the parentheses under the item of flame retardant show the amount (parts by weight) per 100 parts by weight of a thermosetting ordinary temperature liquid resin (manufactured by Kaneka Corporation, trade name "ACX022") composed of terminal allylated polyoxypropylene. The void content of the adhesive layer was calculated based on the void content calculation formula (1) explained above.

TABLE 1

|  |  | Comparative Example 1 | Comparative Example 2 | Comparative Example 3 | Example 1 | Example 2 | Example 3 |
|---|---|---|---|---|---|---|---|
| adhesive | | polyoxy-alkylene | polyoxy-alkylene | polyoxy-alkylene | polyoxy-alkylene | polyoxy-alkylene | polyoxy-alkylene |
| flame retardant | | APP(50) TCP(20) | APP(50) TCP(30) | APP(50) TCP(30) | APP(50) TCP(30) | APP(50) TCP(30) | APP(50) TCP(30) |
| tackifier | | — | 15 | 20 | 20 | 20 | 20 |
| core film (thickness: μm) | | PP(20) | PP(20) | PP(20) | PP(20) | PP(20) | none |
| substrate sheet | | PTFE | PTFE | PTFE | PTFE | PTFE | PTFE |
| specific gravity (g/cm$^3$) of adhesive | | 1.23 | 1.20 | 0.74 | 0.92 | 0.83 | 1.02 |
| void content (%) of adhesive layer | | 1.6 | 4 | 41 | 26 | 33 | 19 |
| constant load test | retention time (seconds) | 22 | 55 | 600 | 333 | 389 | 241 |
| corrosiveness test | corroded area (%) | 44 | 3 | 0 | 0 | 0 | 0 |
| horizontal combustion test | combustion time (seconds) | 2.3 | 2.5 | 14.3 | 6.0 | 11 | 3 |
| perpendicular combustion test | combustion time (seconds) | 4.7 | 3.8 | 30 | 4.3 | 16.3 | 4 |

As is clear from Table 1, the sealing sheet of the present invention is stable in and does not react even with salt water, has superior moisture permeability resistance (water permeability resistance), is capable of maintaining superior seal performance of a sealed object (duralumin plate), and realizes a sealing sheet simultaneously showing high flame retardance and high seal performance.

The invention claimed is:

1. A sealing sheet comprising a flame retardant adhesive sheet having a flame retardant-containing adhesive layer,
    wherein the flame retardant-containing adhesive layer has a void content of 15-40%,
    wherein the flame retardant adhesive sheet has a substrate sheet laminated on one surface thereof,
    wherein the substrate sheet is a polytetrafluoroethylene (PTFE) sheet,
    wherein the flame retardant-containing adhesive layer is a flame retardant-containing polyoxyalkylene adhesive layer,
    wherein the flame retardant-containing polyoxyalkylene adhesive layer contains a tackifier resin,
    wherein the tackifier resin comprises a rosin based tackifier resin,
    wherein the flame retardant is a halogen-free flame retardant, and
    wherein the halogen-free flame retardant comprises ammonium polyphosphate (APP) and tricresyl phosphate(TCP).

2. The sealing sheet according to claim 1, wherein the flame retardant-containing polyoxyalkylene adhesive layer is a cured product layer of a composition containing the following components A-D:

A: a polyoxyalkylene polymer having at least one alkenyl group in one molecule
   B: a compound containing two or more hydrosilyl groups on average in one molecule
   C: a hydrosilylation catalyst
   D: a flame retardant.

3. The sealing sheet according to claim 1, wherein the flame retardant adhesive sheet is an adhesive sheet composed of a laminate of flame retardant-containing adhesive layer/core film/flame retardant-containing adhesive layer.

4. The sealing sheet according to claim 3, wherein the core film is composed of a plastic film.

5. The sealing sheet according to claim 1, wherein the flame retardant adhesive sheet is an adhesive sheet composed of a single flame retardant-containing adhesive layer.

6. A method of protecting corrosion of a metal material, comprising isolating the metal material from humidity and water (salt water) with a sealing sheet according to claim 1.

7. The method according to claim 6, wherein the metal material is a duralumin plate.

8. The method according to claim 6, wherein the flame retardant-containing polyoxyalkylene adhesive layer is a cured product layer of a composition containing the following components A-D:

A: a polyoxyalkylene polymer having at least one alkenyl group in one molecule
   B: a compound containing two or more hydrosilyl groups on average in one molecule
   C: a hydrosilylation catalyst
   D: a flame retardant.

9. The method according to claim 6, wherein the flame retardant adhesive sheet is an adhesive sheet composed of a single flame retardant-containing adhesive layer.

10. The method according to claim 6, wherein the flame retardant adhesive sheet is an adhesive sheet composed of a laminate of flame retardant-containing adhesive layer/core film/flame retardant-containing adhesive layer.

* * * * *